UNITED STATES PATENT OFFICE.

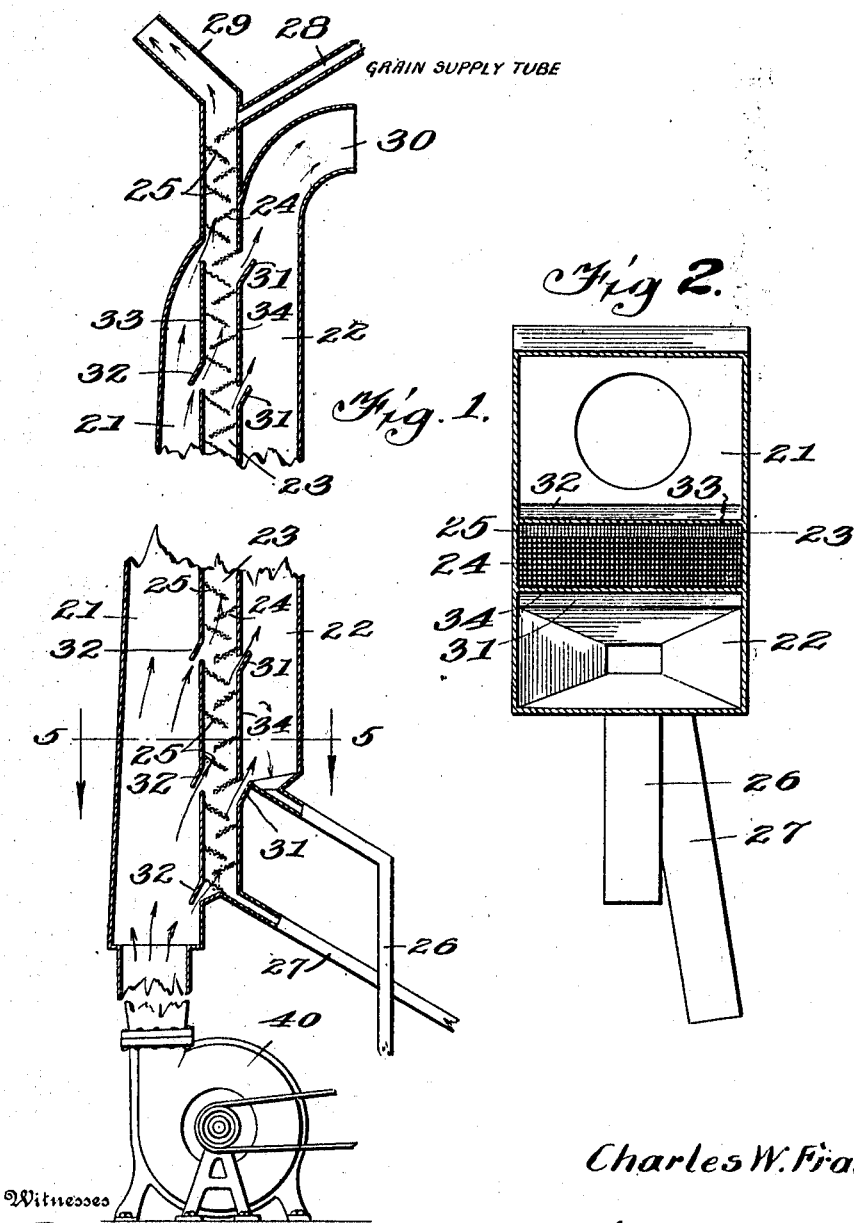

CHARLES W. FRANKLIN, OF LEIPSIC, OHIO.

GRAIN-PURIFIER.

988,765.  Specification of Letters Patent.  Patented Apr. 4, 1911.

Application filed July 9, 1908. Serial No. 442,654.

*To all whom it may concern:*

Be it known that I, CHARLES W. FRANKLIN, citizen of the United States, residing at Leipsic, in the county of Putnam and State of Ohio, have invented certain new and useful Improvements in Grain - Purifiers, of which the following is a specification.

This invention is a grain purifier, for the purpose of purifying grain, and includes a device for purifying, scouring or cleaning the same. The grain is first run through a drier, and is then run through the purifier, in order to produce the desired result.

In the accompanying drawings,—Figure 1 is a vertical section of the purifier or cleaner; Fig. 2 is a section on the line 5—5 of Fig. 4.

The purifier or cleaner comprises an upright fresh air box 21, and an upright exhaust box 22 for the foul air and waste. Between these two boxes is a vertical grain box or chute 23, having a series of reversed screen shelves 24 and 25 arranged so that the grain will naturally run from one to the other and will be spread over the same, causing it to roll and turn back and forth until it reaches the outlet at the bottom. The grain is fed at the top of the grain box through a spout 28. The partition 33 between the fresh air box 21 and the grain box 23 has a series of openings from the top of which deflector plates 32 extend downwardly and outwardly at such an angle as to gather up and deflect the air diagonally across the grain box. The partition 34 between the waste box 22 and the grain box has a series of air outlet openings from the bottom of which openings deflector plates 31 extend upwardly and outwardly at such an angle that the foul air is deflected upwardly as it enters the waste box 22, thus giving the broken and light grain a chance to drop downwardly into said box in the bottom of which it collects. The grain box has an outlet at the bottom indicated at 27. The foul air box has an outlet spout 26 at the bottom to collect and save broken and light grain in the form of heavy screenings. The grain box 3 has an outlet 29 at the top for foul air and dust, and the foul air box 22 has an outlet 30 at the top for the same purpose. The fresh air box 21 tapers toward the top so as to make the pressure even, and receives the air under pressure at the bottom from a fan 40.

The zig-zag arrangement of the perforated shelves in the grain box causes a flow of grain in a sheet from one to the other, and the air forced into the fresh air box enters through the openings in the partition 33 and is forced upwardly through the screen shelves, carrying with it dust and dirt and forcing the same out through the openings in the partition 34 into the exhaust or foul air box. This box is of large capacity, so as to let the heavy screenings and grain settle to the bottom of the box whereby all values are saved, the foul air and dust passing out at the top. The inlet and outlet openings in the opposite side of the grain box are so arranged that the air entering one inlet must pass up through several shelves before reaching the next outlet, and this prevents any heavy grain being blown out into the foul air box.

By running the grain first through a drier and then through the purifier, it will be effectively dried, scoured, cooled, and cleaned, and no machinery is required except the fans referred to, and the apparatus will be found very useful in mills, elevators, and the like, for the purpose of treating and preparing grain for market.

I claim:

A grain purifier comprising an elongated vertical box having a series of angular screens placed in zigzag relation one above the other to cause a flow of grain downwardly through the series in alternately opposite directions, said box having also an inlet for grain and a separate outlet for foul air at its top and an outlet for grain at its bottom, a fresh-air box extending up one side of the grain box, and a foul air box extending up on the opposite side thereof, the inner walls of said fresh and foul air boxes being provided with openings to admit fresh air to the grain box, and to permit the escape of foul air therefrom, each outlet opening being located a distance above the corresponding inlet opening, equal to several of said grain screens, deflector plates extending downwardly and outwardly from the top of the inlet openings into the fresh air box to deflect the air diagonally across the grain box, and deflector plates extending upwardly and outwardly from the bottom of the outlet openings into the foul air box to deflect the air upwardly as it enters the latter.

In testimony whereof, I affix my signature in presence of two witnesses.

CHARLES W. FRANKLIN.

Witnesses:
  A. A. SLAYBAUGH,
  GEORGE R. PLACE.